United States Patent

Fujinawa et al.

[11] Patent Number: 4,485,410
[45] Date of Patent: Nov. 27, 1984

[54] GRAPHIC READING

[75] Inventors: Masaaki Fujinawa; Susumu Saito, both of Hachioji, Japan

[73] Assignees: Hitachi, Ltd.; Hitachi Koki Co., Ltd., both of Tokyo, Japan

[21] Appl. No.: 415,454

[22] Filed: Sep. 7, 1982

[30] Foreign Application Priority Data

Sep. 7, 1981 [JP] Japan ............... 56-140609

[51] Int. Cl.³ .............................. H04N 1/30
[52] U.S. Cl. ..................... 358/294; 358/293
[58] Field of Search ............ 358/285, 293, 294

[56] References Cited

U.S. PATENT DOCUMENTS 4,204,725 5/1980 DiStefano .............. 358/294
4,314,154 2/1982 Minoura ............... 358/293

Primary Examiner—Howard W. Britton
Attorney, Agent, or Firm—Antonelli, Terry & Wands

[57] ABSTRACT

An original is first illuminated with a light beam of white color or a wavelength adapted for reading of the original, and an optical image of the original is focused on a photosensitive drum previously charged uniformly, to form an electrostatic latent image on the photosensitive drum. Thereafter, the photosensitive drum is scanned with a laser beam, and a discharge current attendant on the scanning is detected and converted into an electric signal representative of the optical image. Thus, a monochromatic laser can read graphic records of any color.

10 Claims, 4 Drawing Figures

GRAPHIC READING

This invention generally relates to graphic reading and more particularly to graphic reading of the type wherein graphical records such as figures and documents are read out with a laser beam and converted into electric signals.

One method conventionally used for reading graphical records such as figures and documents is a laser scanning method wherein the graphical record is scanned with a laser beam and a reflected beam from the graphical records is detected and converted into an electric signal by means of a photodetector. The laser scanning method is advantageous in that the scanning speed can be made so high as to greatly reduce the time required for reading because the laser beam can be focused to a high energy density beam as compared to ordinary visible rays.

In the laser scanning method, however, the laser beam used for scanning the original is monochromatic and accordingly, a graphical record written in a color equivalent to the wavelength of the laser beam cannot be read out effectively. In particular, with a He-Ne laser or a semiconductor laser having a laser wavelength in the red color region or near infrared region, difficulties are encountered in reading an original written in red or the like color ink, for example, a seal.

An object of this invention is to solve the aforementioned problem in the laser scanning method and provide graphic reading employing the laser scanning and being capable of reading originals written in any optional color.

In graphic reading according to an aspect of the invention, an optical image is converted into an electrostatic latent image, the electrostatic latent image is scanned with a monochromatic laser beam, and discharge current generating from the latent image is detected for reading an original written in any optional color at high speeds.

An embodiment of the invention will become apparent from the following detailed description taken in conjunction with the accompanying drawings, in which.

Figure 1:
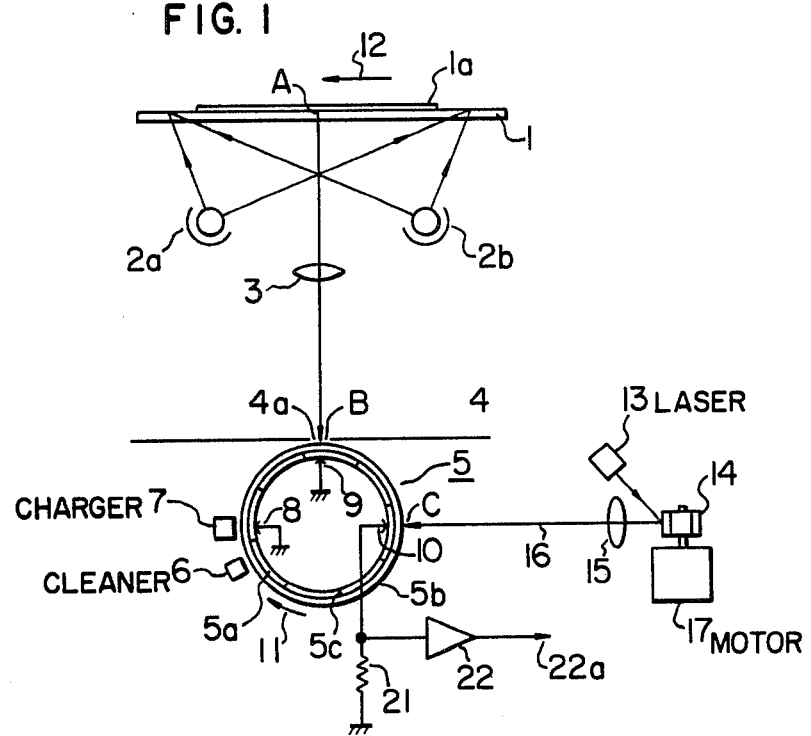
FIG. 1 is a schematic diagram showing a graphic reader embodying the invention.
Figure 2A:
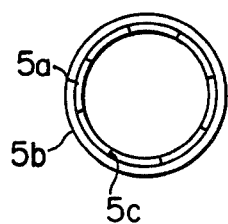
FIG. 2A is a front view of a photosensitive drum used in the graphic reader of FIG. 1.
Figure 2B:
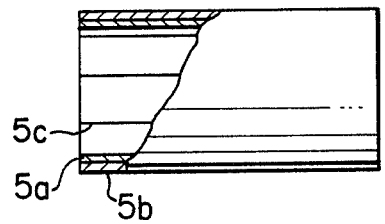
FIG. 2B is a side view, partly exploded, of the photosensitive drum.

Referring to FIG. 1, there is shown a graphic reader embodying the invention comprising an original stand 1, an illumination light source 2a and 2b, such as fluorescent lamps, an image forming lens 3, a light shielding plate 4, and a photosensitive drum 5. The photosensitive drum 5 is shown in its front view and side view, partly exploded, in FIGS. 2A and 2B. An original 1a carried on the original stand 1 is illuminated by the illumination lamps 2a and 2b disposed obliquely below the original stand 1. A reflected beam from a portion A of a graphical record contained in the original 1a reaches the photosensitive drum 5 through the image forming lens 3 and a slit 4a in the light shielding plate 4, thereby forming an image of the portion A on a portion B of the photosensitive drum 5. The photosensitive drum 5 has a cylindrical electrode 5a and a photoconductive layer 5b formed on the outer surface of the cylindrical electrode 5a. The cylindrical electrode 5a is divided by insulators 5c into a number of arcuate segment electrodes which are elongated in the axial direction and insulated from each other, for reasons to be described later.

Disposed exteriorly of the photosensitive drum 5 are a cleaner unit 6 and a charger unit 7 with disposition of contacts 8, 9 and 10 in the interior of the photosensitive drum 5. As the photosensitive drum 5 is rotated in a direction of arrow 11 by a drive mechanism (not shown), an electric charge on the outer surface of the photoconductive layer 5b is completely removed by means of the cleaner unit 6 to establish a discharged state and thereafter the outer surface of the photoelectric layer 5b is uniformly charged by means of the charge unit 7 and the contact 8. When the cleaner unit 6 is disposed close to the charger unit 7 as shown in FIG. 1, the contact 8 associated with the charger unit 7 can be used in common also for the cleaner unit 6 which is particularly adapted for discharging the photoconductive layer 5b.

With the rotation of the photosensitive drum 5, an optical image in the form of a reflected beam from the original 1a is focused on the outer surface of the photoconductive layer 5b at the position B through the slit 4a. In this case, the original stand 1 carrying the original 1a moves in a direction of arrow 12 in synchronism with the rotation of the photosensitive drum 5. The photoconductive layer 5b of the photosensitive drum 5 moves across the position B at the same speed as the moving speed of the original 1a (or the image of the original 1a). A portion of the photoconductive layer 5b irradiated by the reflected beam is rendered conductive and electric charge on the irradiated or exposed portion is discharged through the contact 9 and in contrast, the electric charge on an unexposed portion of the photoconductive layer 5b remains thereon, thereby forming on the photoconductive layer an electrostatic latent image corresponding to the optical image in the form of the reflected beam from the original.

With further rotation of the photosensitive drum 5, the outer surface of the photoconductive layer 5b is scanned in the axial direction thereof at a position C with a laser beam 16 which is emitted from a laser 13, reflected at a rotary polygonal mirror 14 and projected on the position C through an Fθ lens 15. Denoted by reference numeral 17 is a motor for driving the polygonal mirror 14.

Figure 3:
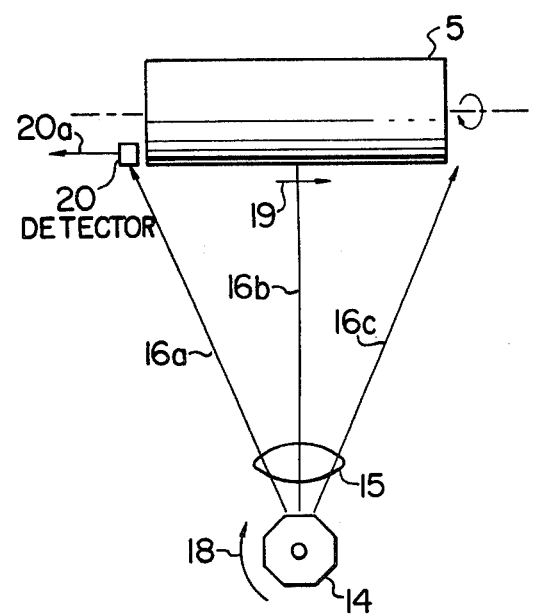
FIG. 3 is a plan view illustrative of the photosensitive drum being scanned with a laser beam.

As diagrammatically shown in a plan view of FIG. 3, with rotation of the rotary polygonal mirror 14 in a direction of arrow 18 during the scanning, the position of the laser beam changes from 16a to 16c through 16b so as to scan the photosensitive drum 5 in the axial direction thereof as designated by an arrow 19.

A photodetector 20 is provided at a scanning start position of the laser beam 16, that is, adjacent to the left end of the photosensitive drum 5. Consequently, the laser beam comes across the photodetector 20 each time the scanning starts, and an output pulse 20a is delivered out of the photodetector 20 as a synchronizing signal. For simplicity of illustration, the photodetector 20 is omitted in FIG. 1.

In this manner, the photosensitive drum 5 is scanned at the position C with the laser beam, a discharge current originating from the electric charge on the photoconductive layer is passed through a resistor 21, and a voltage drop across the resistor 21 is amplified at an amplifier 22 and delivered therefrom in the form of a video signal 22a. Concurrently therewith, the output pulse 20a indicative of the start of scanning is delivered out of the photodetector 20 as the synchronizing signal.

Thus, the photosensitive drum 5 is subjected to cleaning by the cleaner unit 6, to charging by the charger unit 7, to formation of an electrostatic latent image at the position B, and to reading of the electrostatic latent image by the laser beam at the positoin C. For the sake of the above operations which the photosensitive drum undergoes, as described previously, the cylindrical electrode 5a is divided by the insulators 5c into a number of arcuate segment electrodes which are elongated in the axial direction and insulated from each other. The number of division is determined by the arrangement of the contacts 8, 9 and 10 so that an arcuate segment electrode which is in contact with the contact 10 is insulated from other arcuate segment electrodes in contact with the grounded contacts 8 and 9.

Also, since as described previously, the laser beam can be of a very high energy density, the scanning speed of the laser beam at the position C can be very high, for example, about 1 Km/sec, thereby ensuring reading at very high speeds.

The photoconductor material used for the photoconductive layer 5b should be responsive to the laser wavelength. When the laser 13 is a He-Ne laser, the photoconductor material may be Se-Te system, arsenic selenide, cadmium sulfide, amorphous silicon, trinitrofluorenone-polyvinylcarbazole, or other organic photoconductor material. When the laser 13 is a semiconductor laser, the photoconductor material may be Se-Te system, assenic selenide telluride, cadmium sulfide, or organic photoconductor materials. The composition of the alloy or mixed crystal system may be varied to adjust the spectral photosensitivity. For example, tellurium composition of the Se-Te system may be decreased for a He-Ne laser and increased for a semiconductor laser.

As has been described, according to the invention, graphical information on the original is read out by using an illumination light beam of white color or a wavelength adapted for the color of a graphical record, converted into an electrostatic latent image on the photoconductive layer, scanned with a monochromatic laser beam, and ultimately read out as an electric signal due to a discharge current originating from electric charge forming the electrostatic latent image. Thus, the invention eliminates disadvantages encountered in the conventional graphic reader wherein the graphical record on the original is directly scanned with the laser beam, and it can assure high speed reading based on the laser beam of the high energy density.

We claim:

1. A graphic reader comprising:
   a photoconductive layer having an outer surface which can be uniformly charged, said photoconductive layer being provided on a cylindrical electrode divided into a plurality of segment electrodes along the axial direction which are insulated from each other in the azimuthal direction;
   means for optically focusing an optical image and forming an electrostatic latent image thereof on said photoconductive layer;
   means for scanning a laser beam on said photoconductive layer,
   means for detecting a discharge current originating from an electric charge of the electrostatic latent image; and
   means for detecting a synchronizing signal for the scanning of the laser beam.

2. A graphic reader comprising:
   a photosensitive drum having a cylindrical electrode and a photoconductive layer provided thereon and being rotatably driven about a central axis of the cylindrical drum, said cylindrical electrode being divided into a plurality of segment electrodes along the axial direction which are insulated from each other in the azimuthal direction;
   first means for removing an electric charge from the outer surface of said photoconductive layer;
   second means for uniformly charging the outer surface of said photoconductive layer;
   third means for optically focusing an optical image and forming an electrostatic latent image thereof on the uniformly charged photoconductive layer;
   scanning means for scanning a laser beam on said photoconductive layer formed with the latent image in a direction along the central axis;
   fourth means for detecting a discharge current originating from electric charge of the electrostatic latent image; and
   fifth means for delivering a synchronizing signal each time the scanning of the laser beam starts.

3. A graphic reader according to claim 2, wherein said third means comprises:
   a slit formed in the central axis direction in a light shielding plate disposed close to said photoconductive layer;
   means for optically reading a graphical record on an original and forming an optical image representative of the graphical record on said photoconductive layer through the slit; and
   means for moving the original in a direction vertical to the central axis direction so that said optical image may be moved in the same direction and at the same speed as those of the movement of said photoconductive layer.

4. A graphic reader according to claim 2, wherein said scanning means comprises a polygonal mirror adapted to reflect the laser beam and project it on said photoconductive layer for the scanning in the central axis direction.

5. A graphic reader according to claim 2, wherein said fifth means comprises a photodetector disposed close to one end of said photoconductive layer in the central axis direction.

6. A graphic reader according to claim 2, wherein at least one of said first, second, third and fourth means is provided with at least one contact which slidably and electrically contacts the cylindrical electrode, said at least one contact being disposed inside the drum.

7. A graphic reader according to claim 2, wherein said fourth means includes a resistor for allowing the discharge current to flow therethrough and for thereby causing a voltage drop depending on the magnitude of the discharge current, whereby the fourth means detects the variation of the discharge current as a variation of the voltage drop.

8. A graphic reader according to claim 2, wherein said photoconductive layer contains at least one material selected from the group consisting of Se-Te system, arsenic selenide, arsenic selenide telluride, cadmium sulfide, amorphous silicon, and organic photoconductor materials.

9. A graphic reader according to claim 2, wherein said first, second, third and fourth means are provided with at least two contacts which slidably and electrically contact the cylindrical electrode for deriving externally the charging or discharging current of said first, second, third and fourth means, and the discharging current of the fourth means is allowed to flow through a segment electrode which is different from the at least one segment electrode through which the charging and discharging currents of the first, second and third means are allowed to flow.

10. A graphic reader according to claim 9, wherein said contacts are disposed inside the drum.

* * * * *